United States Patent [19]
Gulistan

[11] 3,765,078
[45] Oct. 16, 1973

[54] METHOD OF ATTACHING A FLOATING NUT TO A WORKPIECE

[75] Inventor: Bulent Gulistan, Malibu, Calif.

[73] Assignee: Deutsch Fastener, Corp., Los Angeles, Calif.

[22] Filed: Oct. 27, 1971

[21] Appl. No.: 193,101

Related U.S. Application Data

[60] Division of Ser. No. 1,706, Jan. 9, 1970, Pat. No. 3,695,324, Continuation-in-part of Ser. No. 855,834, Sept. 8, 1969, abandoned.

[52] U.S. Cl.................... 29/432, 29/453, 29/512, 29/523, 29/525
[51] Int. Cl............................................ B23p 11/00
[58] Field of Search................. 29/512, 525, 523, 29/432, 453; 151/41.72, 41.73, 41.76, 41.74

[56] References Cited
UNITED STATES PATENTS

| | | | |
|---|---|---|---|
| 2,026,757 | 1/1936 | Swanstrom...................... | 151/41.72 |
| 2,058,319 | 10/1936 | Jones.............................. | 29/453 UX |
| 2,243,923 | 6/1941 | Swanstron...................... | 151/41.76 |
| 2,621,088 | 12/1942 | Cole................................ | 29/453 X |
| 2,986,188 | 5/1961 | Karp et al........................ | 151/41.73 |
| 3,209,958 | 10/1965 | Sundholm...................... | 29/453 X |
| 3,242,564 | 3/1966 | Longhini......................... | 29/453 X |
| 3,314,465 | 4/1967 | Bien................................ | 29/453 X |
| 3,461,936 | 8/1969 | Rosan et al..................... | 151/41.72 |
| 3,131,743 | 5/1964 | Hinkle............................. | 151/41.74 |

*Primary Examiner*—Charlie T. Moon
*Attorney*—Richard F. Carr

[57] ABSTRACT

An arrangement for attaching a nut to a workpiece in which an element is provided with opposed sidewalls and a bottom wall, with a tubular part extending from the bottom wall, a nut is attached to the element by extending tabs on the nut into apertures in the sidewalls, with the nut being made smaller laterally than the spacing between the sidewalls so that it can float, a knurl is provided on the tubular part which is extended through an opening in a workpiece, and a flange is bent outwardly at the end of the tubular part compressing the material of the workpiece inwardly around the knurl to hold the assembly to the workpiece and prevent its rotation.

10 Claims, 13 Drawing Figures

Patented Oct. 16, 1973
3,765,078
5 Sheets-Sheet 1
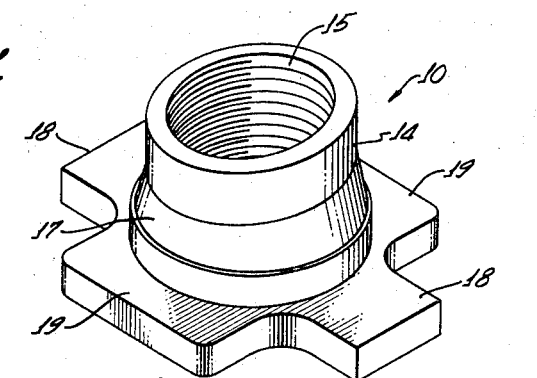
Fig. 1.
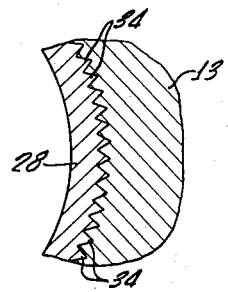
Fig. 5.
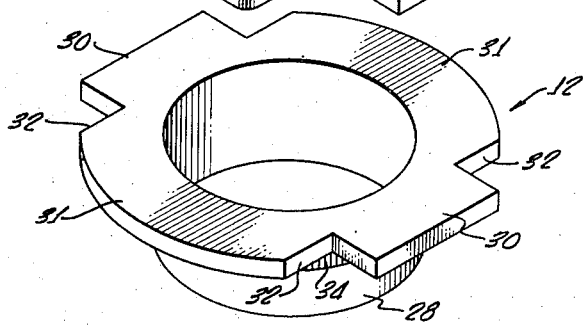
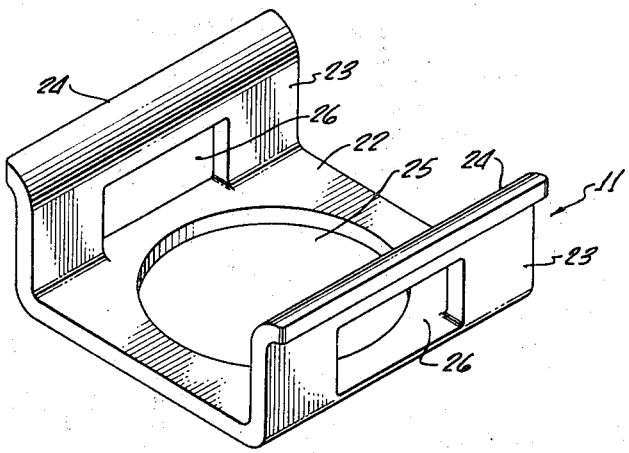
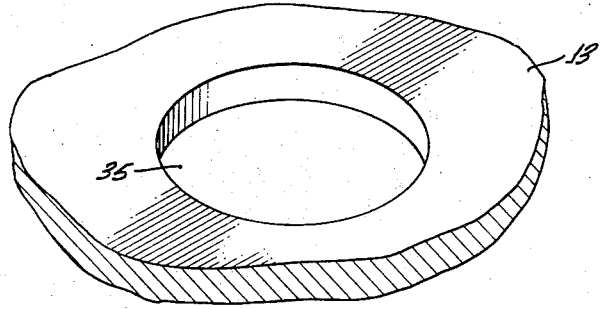

Patented Oct. 16, 1973

METHOD OF ATTACHING A FLOATING NUT TO A WORKPIECE

REFERENCE TO RELATED APPLICATIONS

This is a division of my copending patent application Ser. No. 1,706, filed Jan. 9, 1970, now U.S. Pat. No. 3,695,324 which is a continuation-in-part of patent application Ser. No. 855,834, filed Sept. 8, 1969, now abandoned.

BACKGROUND OF THE INVENTION

1. Field of the Invention
This invention relates to a fastener.
2. The Prior Art Nut plates have been used extensively on panels and other parts, providing a means for holding a nut to the part so that it is always available, while also allowing for limited floating movement of the nut so that it can be more easily engaged by a bolt. Such a fastening device includes a receptacle which is provided by a flat plate from which portions are bent to engage and retain flanges projecting from the nut. This holds the nut to the receptacle, while allowing movement of the nut.

The receptacle includes an extension on either side of the nut, each having an opening for the purpose of receiving separate fasteners used in securing the receptacle to the workpiece. Normally, a rivet is received in each of these openings to provide the attachment means. Therefore, to install the assembly on a workpiece, it is necessary to drill three accurately spaced openings through the workpiece. Two of these are for the rivets used in securing the receptacle to the workpiece. Between them is a larger opening through which the threaded shank of a bolt may pass for engaging the nut. In addition to drilling the three holes, it is then necessary to extend the rivets through the outer openings and upset them to complete the fastening sequence. This is a time-consuming and, therefore, relatively expensive operation. Furthermore, the need for the extra openings for the rivets in some instances can undesirably weaken the part to which the assembly is to be attached. Removal of the assembly also takes time in requiring removal of the two rivets to permit the unit to be separated from the workpiece. The necessity of dimensioning the receptacle so as to include the two rivet holes causes it to be relatively long, so that it may not be possible to fit the assembly at corners and certain locations where spacing is limited. Special receptacle designs then are required, and these are a great deal more expensive than those of conventional construction. Inventory costs are increased by the necessity to stock different versions of the nut plate so that those having special receptacles are available as needed.

An effort has been made to provide a floating nut plate which avoids the use of the rivets for attachment to the workpiece through the provision of a knurled sleeve to fit in the opening in the workpiece, becoming embedded so as to resist rotation. Examples of this design are found on pages 136 and 137 of General Catalog 669, Elastic Stop Nuts, 1969, Amerace Esna Corporation, Union, New Jersey. This nut plate is made up of two pieces, which are a basket member having slotted sidewalls that receive projecting tabs on a nut to allow limited floating movement. A tubular portion on the basket member is provided with a straight knurl on its wall to dig into the periphery of the opening that receives it in the workpiece, thereby to prevent rotation of the nut plate. A punch driven into the open end of the tubular portion causes it to be expanded outwardly slightly to become embedded further into the circumferential wall of the opening in the workpiece to retain the nut plate axially.

A disadvantage of this design is that the knurl does not become securely embedded in the wall of the opening, so that it possesses a very low torque resistance. Upon subsequent engagement by a bolt, the entire nut plate may be turned with the bolt, preventing the bolt from being threaded into the nut. Also, the basket must be of malleable material to allow the end portion of the sleeve to be flared outwardly in the opening to retain the nut plate axially. This means that the walls of the basket that receive the tabs of the nut also are of malleable material. Consequently, the walls of the basket will fatigue upon being bent, which prevents repeated removal and installation of the nut on the basket. It is important to be able to remove a damaged nut from the basket for replacement during the service life of the nut plate. If the basket is pulled out of the opening to remove the entire nut assembly, the expanded end portion may tear the material, causing the entire workpiece to become unusable so that it must be discarded. Even when this does not occur, the knurl marks will remain, which also may cause damage to the part. With the end portion of the tubular portion being only expanded within the opening in the part, a minimum of axial retention force is generated, so that the nut plate is not securely held.

Additionally, in the prior art, there are various kinds of clinch nuts which provide a threaded element attached to a workpiece, although not of the nut plate variety and without the floating movement provided by a nut plate. Examples of such clinch nuts are found on pages 138–143 of the above-mentioned catalog; page 154 of Assembly Directory and Handbook, 1969 by Hitchcock Publishing Company, Wheaton, Illinois; and a different version shown in my U.S. Pat. No. 3,561,093. These designs include a tubular projection from the nut, with a straight knurl on the tubular projection to become embedded in the workpiece to resist rotation. Unlike the nut plate design in the catalog, the clinch nuts may be flared over to provide a flange overlapping the surface of the workpiece beyond the end of the opening that receives the tubular section. For the nut shown in the above-referenced patent, the flange is made radial so that it forces inwardly the material of the workpiece displaced by the knurl at the end of the opening. This compresses the material around the knurl to increase rotation resistance. This technique has not been used previously for nut plates, however.

SUMMARY OF THE INVENTION

The present invention provides an improved lightweight floating nut arrangement that drastically simplifies and reduces the time required in installing the assembly to the workpiece. It includes a basket having upwardly extending sidewalls with slots in them which receive tabs projecting from a sleeve member having a tubular section extending through a central opening in the basket member. The nut also has tabs projecting through the slots in the sidewalls of the basket member, and is dimensioned so that while the tabs hold the nut to the basket member the nut is permitted to have limited floating movement. The basket member is made of resilient material so that its sidewalls may be deflected repeatedly to permit removal and replacement of the nut, without fatigue failure from the bending of the sidewalls. This allows damaged nuts to be replaced without requiring a complete new nut plate assembly.

Attachment of the assembly to the workpiece is accomplished by extending the tubular section through a single opening in the workpiece. A straight knurl is provided on the tubular portion and becomes embedded in the periphery of the opening in the workpiece, which thereby prevents rotation of the assembly. The end of the tubular section projects beyond the end of the opening in the workpiece, and is bent outwardly to form a flange that cooperates with the basket member in retaining the assembly to the workpiece. In order to permit an accurately formed flange to be produced, the sleeve member is made of a malleable material. Consequently, the flange can be bent easily and will retain the contour given to it. The shank of the mating bolt extends through the opening in the tubular section to engage the threaded bore of the nut.

No separate fastening elements are required, nor is it necessary to drill more than one opening through the workpiece. The insertion of the part in the single opening in the workpiece is accomplished very rapidly as is the bending of the flange that attaches it to the workpiece. The unit is compact and light by avoiding the need for projecting portions to receive rivets or other auxiliary fastening elements. Removal of the assembly is accomplished easily by merely pulling outwardly on it so as to straighten out the attaching flange that had been provided. However, for some parts, such as panels of plastic material, the material around the opening may be damaged by the reaction of the flange against the part as the assembly is pulled outwardly to straighten the flange for removal. The entire panel then must be discarded. This makes it particularly advantageous to be able to replace the nut alone as with the present invention, with the other components of the nut assembly remaining attached to the part.

The nut can be removed from the basket by deflecting a sidewall outwardly to allow the tab on the nut to be taken out of the slot. The sidewalls have outwardly inclined upper edges, which facilitate their deflection during attachment or removal of the nut.

The nut plate may be made in a two-piece version in which the basket and sleeve members are combined. This is desirable in reducing the number of parts in the assembly. However, with the tubular section necessitating malleability so that the flange can be formed, the sidewalls also must be malleable when they are integral with the tubular section. As a result, repeated flexing of the sidewalls will cause fatigue failure and there is only limited capability for nut replacement.

An object of this invention is to provide a floating nut assembly that is easily and quickly installed on a workpiece.

Another object of this invention is to provide a floating nut assembly that is compact and allows one design to be used in a wide variety of locations.

A further object of this invention is to provide a floating nut assembly avoiding the use of auxiliary fastening devices to secure it to a workpiece.

An additional object of this invention is to provide a floating nut assembly requiring only one opening in the workpiece, with no need for extra apertures for auxiliary fastening elements.

Yet another object of this invention is to provide a floating nut assembly that is readily removable from a workpiece, and which allows the nut to be removed from the receptacle and replaced.

A still further object of this invention is to provide a floating nut assembly that is light in weight.

An additional object of this invention is to provide a floating nut assembly that does not require auxiliary fastening means, yet which has good torque resistance.

These and other objects will become apparent from the following detailed description taken in connection with the accompanying drawings.

BRIEF DESCRIPTION OF THE DRAWINGS

FIG. 1 is an exploded perspective view of the floating nut of this invention;

FIG. 5 is an enlarged fragmentary sectional view, taken along line 5—5 of FIG. 4, illustrating the manner in which the knurl on the tubular section becomes embedded in the periphery of the opening in the workpiece to prevent rotation of the nut assembly;

DESCRIPTION OF THE PREFERRED EMBODIMENTS

Figure 2:
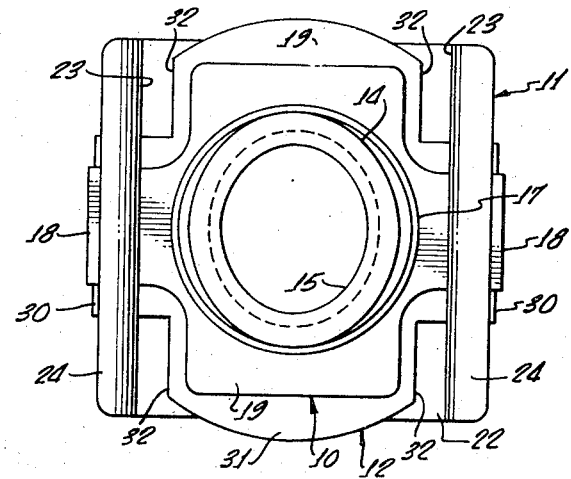
FIG. 2 is a top plan view of the floating nut in the assembled condition.

The nut plate fastener of this invention as illustrated in FIGS. 1–9 consists of three parts that include a nut 10, a basket 11 and an attaching sleeve 12. The basket 11 holds the nut 10, allowing limited floating movement, while preventing substantial rotation of the nut. The sleeve 12 secures the basket 11 to the workpiece 13.

The nut 10 has an upper portion 14 provided with a threaded opening 15 for engagement with the threaded shank of a bolt when in use. An unthreaded counterbore 16 extends into the bottom portion of the nut, communicating with the threaded bore 15. The upper portion 14 of the nut may be slightly elliptical, so that a locking effect will be realized when the circular shank of a bolt is received in the opening 15.

Two diametrically opposed, outwardly projecting tabs 18 are located on opposite sides of the bottom portion 17 of the nut 10. Wider but shorter tabs 19 also project outwardly from the bottom portion 17 of the nut, being at right angles to the tabs 18. The lower surface 20 of the nut is flat.

The basket 11 is a sheet metal member substantially U-shaped in side elevation. A springy material, such as 1095 carbon steel, is used for the member 11. In defining its U-shaped contour, the member 11 includes a flat bottom wall 22 and parallel sidewalls 23 that are bent upwardly at right angles from the bottom wall. The top edge portions 24 of the sidewalls 23 are rounded over and bent outwardly away from the center of the member 11. An opening 25, somewhat larger in diameter than the counterbore 16 of the nut 10, is formed in the central portion of the bottom wall 22. Generally rectangular openings 26, the lower edges of which extend to the bottom wall 22, are provided in the sidewalls 23.

The attaching sleeve 12 is of malleable material, typically 304 stainless steel, and includes a central tubular portion 28 of relatively thin wall defining a cylindrical bore. Outwardly from one end of the tubular portion 28, a pair of diametrically opposed tabs 30 project at right angles to the axis of the tubular section. The tabs 30 are nearly as wide as the openings 26 in the walls 23 of the basket 11. Additional and slightly wider tabs 31, having parallel side edges 32, also project outwardly from the end of the tubular section 28 at right angles to its axis. The tabs 31 extend in a direction perpendicular to that of the tabs 30.

Around the periphery of the tubular section 28 is a straight knurl 34, which is spaced inwardly from either end of the tubular portion. The distance between the knurl 34 and the tabs 30 and 31 is substantially the same as the thickness of the bottom wall 22 of the basket 11. The outside diameter of the knurled portion 34 is almost as large as the diameter of the opening 25 in the wall 22.

When the nut plate fastener is assembled, the tubular section 28 of the attaching sleeve 12 is extended through the opening 25 in the wall 22 of the basket 11. The tabs 30 and 31 are brought into engagement with the upper surface of the wall 22 of the member 11, with the tabs 30 extending through the openings 26 in the sidewalls 23 of the member 11. The tabs 30, being substantially the width of the slots 26, prevent rotation of the attaching sleeve 12 relative to the basket 11. Also, the side edges 32 of the tabs 30 are adjacent the sidewalls 23 of the basket 11 and assist in precluding relative rotation of the parts 11 and 12.

The nut 10 fits over the attaching sleeve 12, with its bottom surface 20 resting on the upper surfaces of the tabs 30 and 31. The diametrically opposed tabs 18 of the nut fit over the tabs 30 of the attaching sleeve 12 and extend through the openings 26 in the sidewalls 23 of the basket 11. The tabs 18 and 30, cooperating with the edges of the openings 26, hold the nut 10 and attaching sleeve 12 to the basket 11, thereby retaining the fastener in its assembled position. It is then ready for attachment to the workpiece 13.

Figure 3:
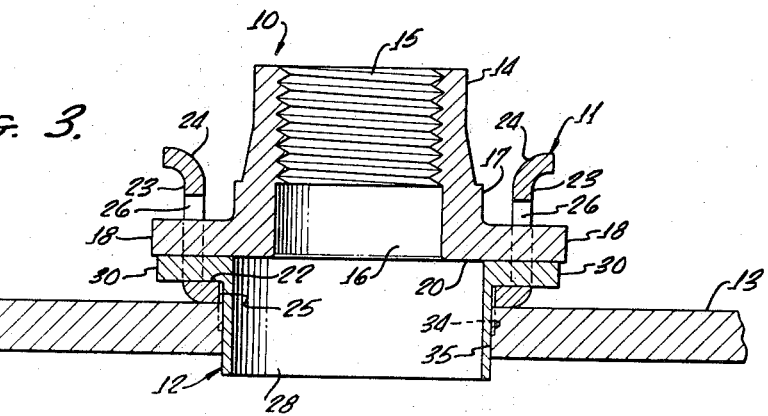
FIG. 3 is a longitudinal sectional view illustrating the assembly during one stage of its attachment to a workpiece.

The latter operation is very easily accomplished by first drilling an opening 35 through the workpiece 13, which is substantially complementary to the outer periphery of the tubular portion 28 of the attaching sleeve 12. The tubular portion 28 then is inserted into the opening 35 and moved axially until the knurl 34 becomes embedded in the periphery of the workpiece 13 at the opening 35 (see FIG. 5). The knurled section 34, cooperating with the workpiece 13 at the opening 35, therefore, prevents rotation of the attaching sleeve 12. With the tubular section 28 forced into the opening 35 in this manner, as shown in FIG. 3, the bottom surface of the lower wall 22 of the basket 11 is brought into engagement with the upper surface of the workpiece 13.

Figure 4:
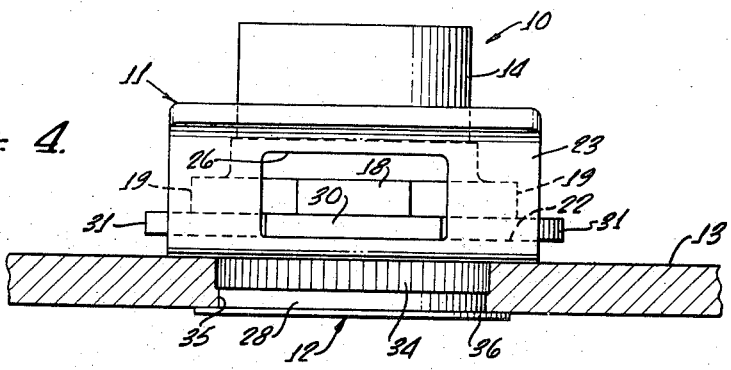
FIG. 4 is a side elevational view, partially in section, showing the nut assembly attached to the work-piece.

The tubular section 28 is longer than the thickness of the workpiece 13, so that the end of the tubular section 28 projects beyond the lower surface of the workpiece 13. This lower portion of the tubular section 28 then is flared outwardly to provide an attaching flange 36, as illustrated in FIG. 4. The flange 36, together with the tabs 30 of the member 12, holds the bottom wall 22 of the basket 11 firmly against the upper surface of the workpiece 13, while retaining the assembled fastener to the workpiece.

Normally in securing the fastener to the workpiece 13, an appropriate tool is used, such as one having a threaded portion which engages the threaded bore 15 of the nut 10, pulling the nut axially toward the upper surface of the workpiece 13 to first cause the knurl 34 to be embedded in the periphery of the opening 35, then engaging the projecting end of the tubular portion 28 to bend the flange 36 outwardly. This operation is performed very rapidly and easily, securely attaching the fastener to the workpiece 13 and holding the basket 11 against movement.

The flange 36 is bent outwardly so that it is at right angles to the axis of the tubular section 28 and closely overlies the surface of the workpiece 13 adjacent the opening 35. This is advantageous in causing the knurl 34 to be more firmly embedded in the workpiece, significantly adding to the torque resistance of the fastener. When the tubular section 28 is forced into the opening 35, the knurl 34 pushes some of the material of the workpiece ahead of it as the knurl is caused to bite into the wall of the opening. Each protrusion of the knurl 34 occupies some space within the workpiece, necessarily displacing material forwardly of the knurl. This produces a slight bulge 37 around the periphery of the opening 35 at the end where the tubular section 28 projects, as seen in the enlarged view of FIG. 7. Subsequently, when the flange 36 is bent to a position where it is at right angles to the axis, the bulge 37 is pushed back inwardly with respect to the opening. This causes the material of the workpiece to become tightly compressed around the teeth of the knurl 34, thereby more firmly gripping the knurl and adding resistance to rotation of the basket member 11. Additionally, the flange 36, by being flat against the surface of the workpiece 13 and tightly forced against it, provides a frictional force that contributes to the retention of the nut plate against rotation. Therefore, the nut 10 will be held from turning when it is engaged by a bolt when the nut plate is in service. When installed in this manner, the nut plate of this invention significantly exceeds torque resistance standards in the aerospace industry.

Figure 6:
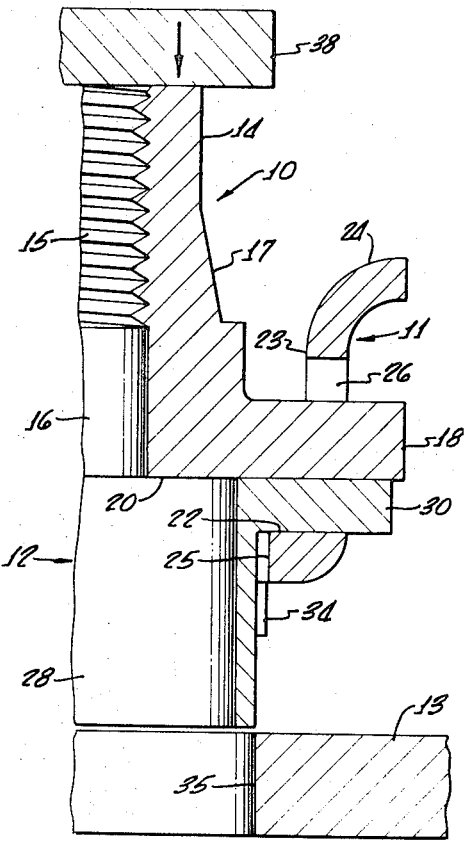
FIG. 6 is an enlarged fragmentary longitudinal sectional view illustrating the fastener of this invention immediately prior to installation in the opening in the workpiece.
Figure 13:
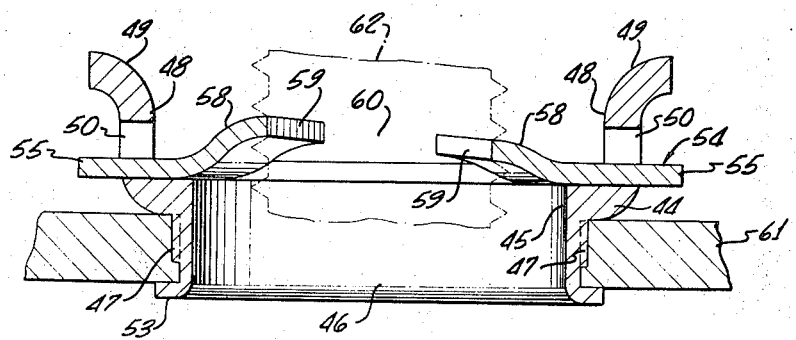
FIG. 13 is a longitudinal sectional view of the device of FIG. 12 assembled and attached to a workpiece.
Figure 7:
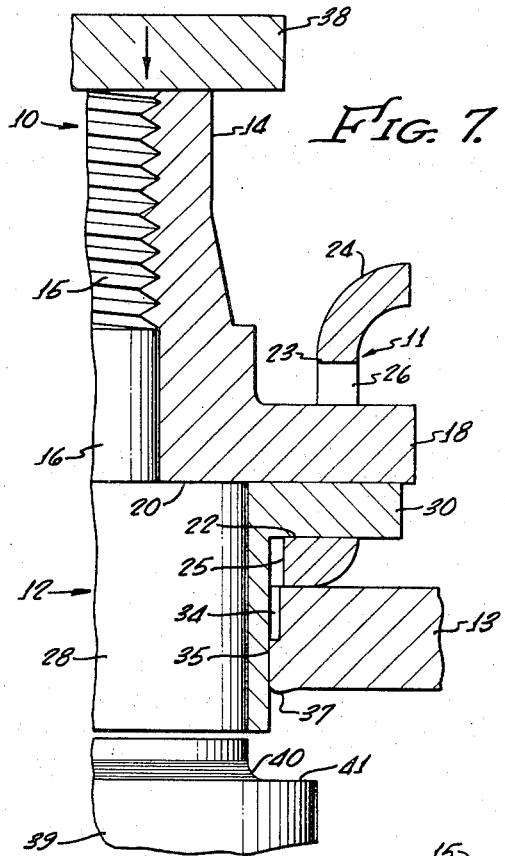
FIG. 7 is a view similar to FIG. 6 showing the fastener after being inserted in the opening in the workpiece, but prior to bending the flange.
Figure 8:
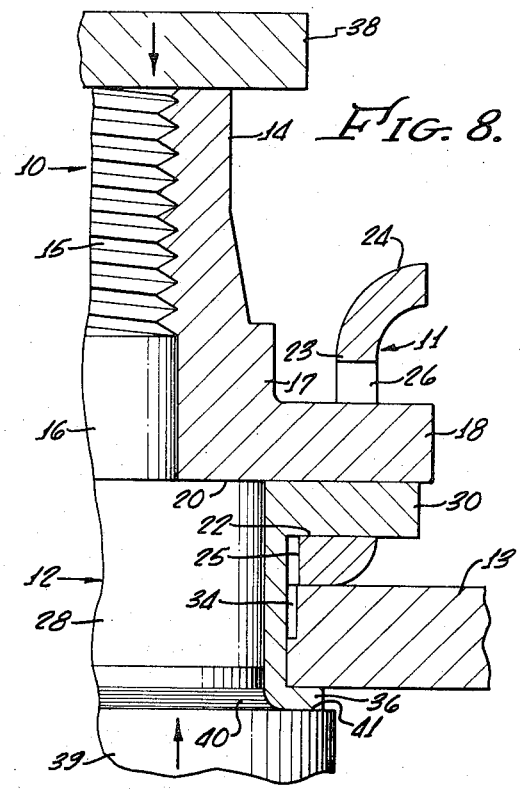
FIG. 8 shows the fastener as the flange is formed.

In sequence, one member of an installation tool initially engages the nut 10, either at its threads or on its outer end as by the member 38 shown in FIG. 6. An axially inward force is exerted by the member 38 on the nut 10, thereby pushing the attaching sleeve 12 axially into the opening 35 from the position of FIG. 6 to that of FIG. 7, and bringing the undersurface of the bottom wall 22 of the basket member 11 into engagement with the surface of the workpiece at one end of the opening 35. With the member 38 continuing to press inwardly on the nut, a die 39 is forced in the opposite direction against the protruding end of the tubular section 28. The die 39 includes an arcuate inner portion having an annular surface 40 concave in cross section, dimensioned so that its end part enters the tubular section 28. The arcuate inner portion tapers outwardly to a flat surface 41 at right angles to the tubular section 28. As the die 39 is advanced axially relative to the tubular section 28, the wall of the tubular section is deflected radially outwardly by the arcuate portion 40 of the die 39, and is forced flat against the surface of the workpiece 13 by the radial die surface 41 (see FIG. 8). This produces the radial flange 36 and forces the bulge axially inwardly relative to the opening 35.

The nut 10 is permitted limited floating movement in all directions. This permits it to engage a bolt which may be misaligned slightly with the opening 35 in the workpiece 13. The tabs 31 are narrower than the spacing between the sidewalls 23 of the basket 11, allowing the nut to move from side to side. Also, the tabs 30, being narrower than the width of the openings 26, allow the nut to be moved in the other direction. Thus, complete transverse floating is provided for. Moreover, the combined thicknesses of the tabs 18 and 30 are a little less than the height of the openings 26 so that it is possible to impart some angularity to the axis of the nut 10 relative to that of the attaching sleeve 12.

When a bolt engages the nut 10 and is turned so as to be advanced into the nut, the latter member can rotate a few degrees until the side edges of the tabs 30 are brought into engagement with the sides of the slots 26 in the sidewalls 23. Also, as the nut 10 becomes turned slightly relative to the basket 11, the corners of the tabs 31 are brought to bear against the sidewalls 23. Thereafter, the tabs 30 and 31 cooperate to hold the nut 10 against further rotation relative to the basket 11.

Figure 9:
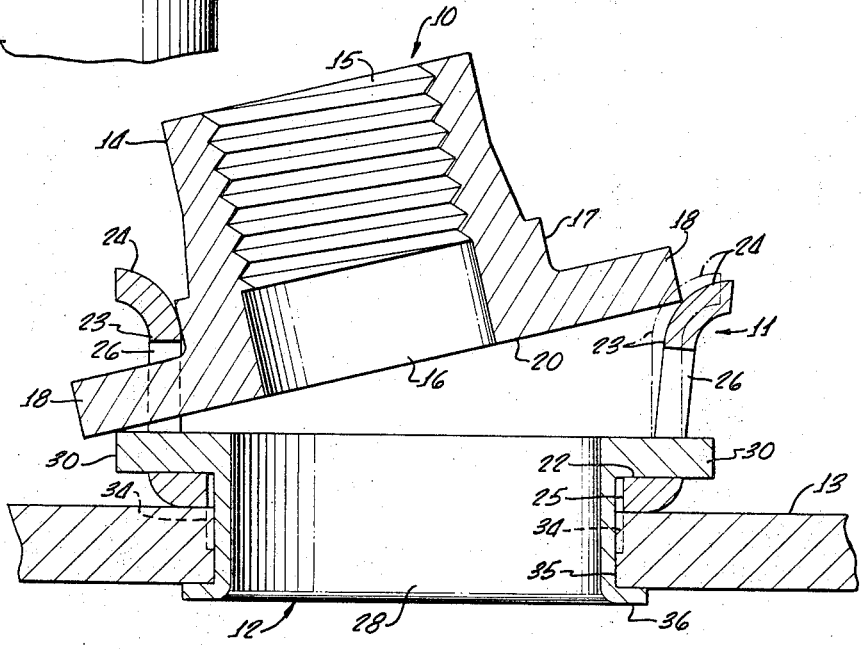
FIG. 9 is a sectional view illustrating the deflection of the sidewall of the basket member during installation or removal of the nut.

The nut 10 may be readily removed from the basket 11, and a replacement may be installed without difficulty. For removal, a screwdriver blade or similar tool may be used to deflect one of the sidewalls 23 outwardly, allowing the tab 18 of the nut 10 to be withdrawn from the opening 26 in that sidewall. The nut then can be separated from the basket 11. For installation of the nut 10, the rounded upper edge 24 of the sidewall 23 facilitates deflection of the sidewall and movement of the tab 18 downwardly into the opening 26. This effect is shown in FIG. 9 as the lower corner of one of the tabs 18 engages the rounded upper edge 24 of one of the sidewalls 23, while the other tab 18 is in the slot 26 of the opposite sidewall. This bends the one sidewall outwardly as the nut 10 is pushed onto the basket 11. By being made of spring material, the sidewall 23 will return to its original position as soon as the tab 18 enters the slot 26, assuring retention of the nut. Because of the use of spring material for the basket 11, repeated removal and replacement of the nuts 10 will have no adverse effect either on the fastener or on the part to which it is attached. The sidewalls may be deflected many times without fatigue failure or other damage. No separate operation of bending the sidewalls inwardly is required upon nut installation because of the automatic return to the upright position, which simplifies the attachment of the nut to the basket 11 and makes it more certain that the nut is retained properly.

Figure 10:
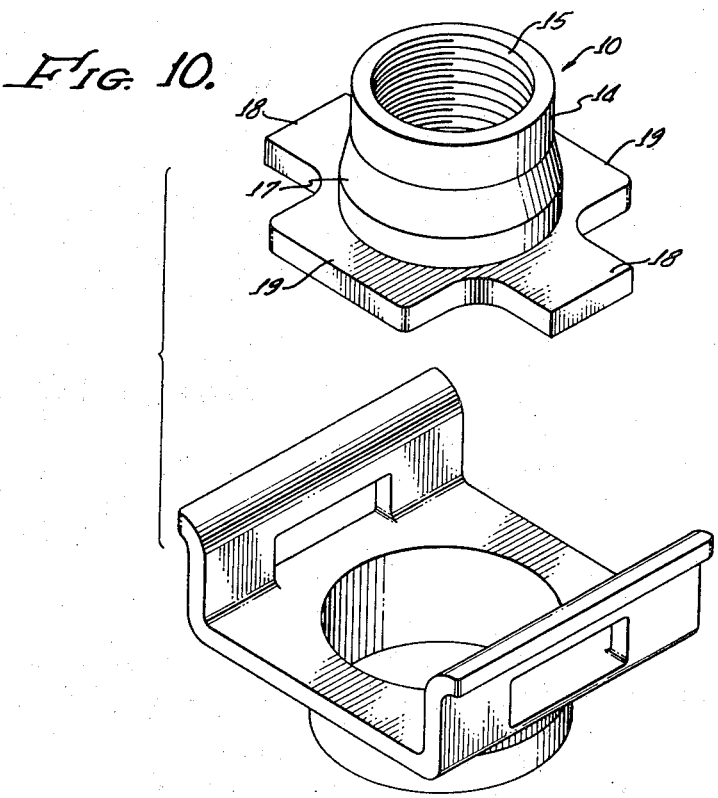
FIg. 10 is an exploded perspective view of a modified two-piece version of the floating nut.
Figure 11:
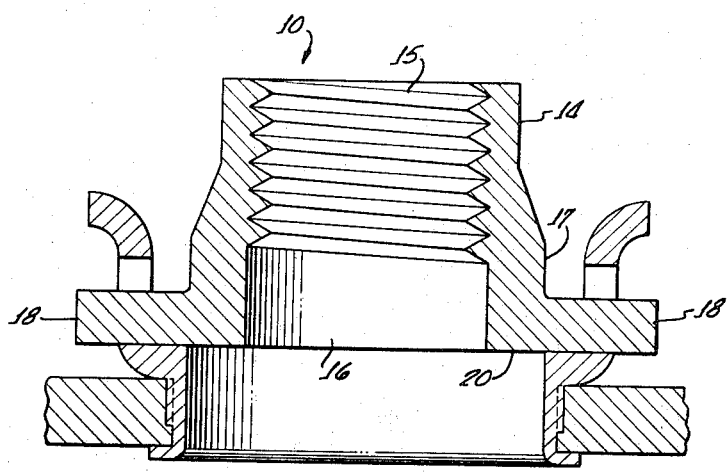
FIG. 11 is a longitudinal sectional view of the floating nut of FIG. 10 assembled and attached to a workpiece.

Certain advantages from the manufacturing standpoint, as well as from the ability to remove and replace the nuts, can be realized by making the floating nut as a three-piece assembly, as described above. The number of parts may be reduced, however, to provide a two-piece nut assembly, as illustrated in FIGS. 10 and 11. In the latter version of the invention, the same nut 10 may be used as in the previously described embodiment. However, instead of the basket 11 and attaching sleeve 12, a single receptacle member 43 is provided that combines the features of both of these separate parts. The member 43, therefore, includes a flat base portion 44 provided with a central opening 45 and a depending tubular portion 46. Adjacent the base 44, a straight knurl 47 is provided on the exterior of the tubular portion 46. The knurl 47 stops short of the outer end of the tubular section 41, providing a thin-walled end part adapted to be bent over in forming a flange. Two sidewalls 48 are included, being bent upwardly from opposite sides of the base portion 44. The sidewalls 48 are parallel through most of their height but include rounded, outwardly bent upper edge portions 49. Rectangular slots 50 are provided in the sidewalls, extending to the base portion 44.

When the fastener is assembled, the nut 10 is positioned in the member 43 so that the bottom surface 20 of the nut rests upon the base portion 44 of the member 43. The tabs 18 of the nut extend outwardly through the slots 50, which thereby secures the nut 10 to the member 43. A clearance is provided as before, so that the nut has freedom for limited floating movement relative to the member 43.

The fastener is attached to a workpiece 51 by extending the tubular portion 46 through a single cylindrical opening 52 in the workpiece. The opening 52 is proportioned with respect to the diameter of the tubular section 46 such that the knurl 47 is caused to dig into the panel 51 at the opening 52, thereby preventing rotation of the member 43 relative to the workpiece 51. The outer end of the tubular portion then is bent outwardly to provide a flange 53 that cooperates with the base 44 of the member 43 in securing the assembled fastener to the workpiece 51. Thus, the installation of the fastener is the same as in the embodiment of FIGS. 1–9, and the fastener of FIGS. 10 and 11 provides many of the same functions and advantages as the other embodiment.

In the design of FIGS. 10 and 11, the receptacle member 43 must possess ductility to allow the tubular portion 46 to be bent outwardly to form the flange 53. Without this characteristic, the flange 53 would not retain its shape and the receptacle member 43 could not be secured adequately to the workpiece 51. This means that the sidewalls 48 also are ductile rather than being of spring material as for the sidewalls 23 of the previously described embodiment. Consequently, there cannot be repeated replacement of nuts 10 on the receptacle 43 because fatigue failure will occur from the bending of the sidewalls 48. Also, in the limited times that the nut may be removed and another installed, the sidewall 48 must be bent back to its original position perpendicular to the base 44 because the sidewall will not spring back to that location. This adds an operation to the installation as well as the chance that the sidewall may not become positioned accurately for holding the nut while allowing the nut its floating movement.

Figure 12:
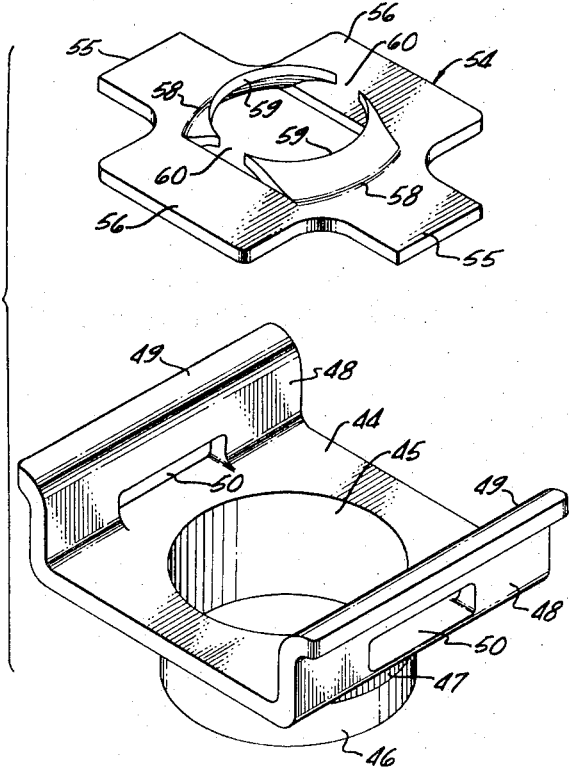
FIG. 12 is an exploded perspective view of a modified form of the invention utilizing a different type of threaded element.

Various forms of thread-engaging or gripping members may be used in place of the nuts described above with their full threaded bores. As illustrated in FIG. 12, a sheet metal member 54 provides the floating element that engages the threaded shank of the mating part. The member 54 includes opposed tabs 55 corresponding to the tabs 18 on the nut 10 of the previously described embodiment. In addition, it includes a second pair of oppositely projecting tabs 56 corresponding to the tabs 19. At the central portion of the member 54, the sheet metal is cut, and portions 58 are bent upwardly. The portions 58 have arcuate inner edges 59, which are defined by segments of a circle less than a semicircle. Spaces 60 separate the corners of the two portions 58.

As illustrated, the member 54 is associated with the receptacle member 43 and attached to a workpiece 61. The alternate design using the basket 11 and the attaching sleeve 12 could be used as well. The tabs 55 of the sheet metal member 54 project through the slots 50 in the sidewalls 48 of the member 43, allowing the member 54 to float relative to the receptacle 43, but assuring that it is secured to the receptacle. The tabs 56 fit between the sidewalls and help limit the floating movement of the member 54. When in use, the shank 62 of a threaded member is extended through the opposed elements 58, being threaded through the opening defined by the opposed inner surfaces 59. The elements 58 can be deflected upon making the threaded engagement, so that they provide the equivalent of a screw thread. This arrangement provides a particularly low-cost version of the fastener suitable where high loading will not be encountered.

The foregoing detailed description is to be clearly understood as given by way of illustration and example only, the spirit and scope of this invention being limited solely by the appended claims.

I claim:

1. The method of attaching a nut to a workpiece with freedom for limited floating movement relative to said workpiece comprising the steps of
   providing a member with a central portion having an opening adapted to receive and engage a threaded shank, and outwardly projecting tab means,
   providing means having opposed sidewalls spaced apart a distance greater than the lateral dimension of said central portion, a bottom wall, and a tubular portion extending from said bottom wall,
   forming an aperture in each of said sidewalls,
   forming a straight knurl on said tubular portion inwardly of the distal end thereof so that said knurl projects radially outwardly of the periphery of said tubular portion,
   inserting said tab means in said apertures for retaining said member to said means,
   providing an opening in a workpiece substantially complementary to said periphery of said tubular portion,
   forcing said tubular portion into said opening in said workpiece so that
   said bottom wall is brought into engagement with said workpiece adjacent one end of said opening in said workpiece,
   said knurl becomes embedded in the wall of said opening in said workpiece,
   a bulge is created around the perimeter of the opposite end of said opening in said workpiece ahead of said knurl,
   and said distal end of said tubular portion projects beyond said opposite end of said opening in said workpiece,
   and then bending said distal end of said tubular portion outwardly so as
   to form a flange overlapping the surface of said workpiece adjacent said opposite end of said opening therethrough including said bulge, and pushing inwardly on said flange to cause said flange to push inwardly on said bulge so as to displace the material of said workpiece forming said bulge inwardly so that said bulge is substantially eliminated and the material of said workpiece is compressed around said knurl.

2. The method as recited in claim 1 in which in said bending of said distal end of said tubular portion outwardly said bottom wall is urged against said workpiece adjacent said one end of said opening, and while said force is so exerted said distal end of said tubular portion is bent outwardly and urged against said surface of said workpiece adjacent said opposite end of said opening, thereby causing the flange so formed to closely overlie said surface of said workpiece and to push inwardly on said bulge.

3. The method as recited in claim 1 in which in said bending of said distal end of said tubular portion outwardly a force is exerted on said means to hold said bottom wall in engagement with said workpiece adjacent said one end of said opening in said workpiece, and while said force is so exerted a die is moved axially toward said opposite end of said opening in said workpiece so as to engage said distal end portion and effect said bending, and to force said flange tightly against said surface of said workpiece so as to push inwardly on said bulge.

4. The method as recited in claim 3 in which, in exerting said force on said means, a force is applied to said member so as to urge said member toward said bottom wall and thereby hold said bottom wall in engagement with said workpiece adjacent said one end of said opening in said workpiece.

5. The method as recited in claim 4 in which for applying said force to said member a tool is pressed against the outer end of said member.

6. The method as recited in claim 1 in which said opposed sidewalls and said bottom wall are formed from a first piece of relatively resilient material, and said tubular portion is formed from a second piece of relatively malleable material.

7. The method of attaching a nut to a workpiece with freedom for limited floating movement relative to said workpiece comprising the steps of
   providing a member with a central portion having an opening adapted to receive and engage a threaded shank, and outwardly projecting tab means,
   providing means having opposed sidewalls spaced apart a distance greater than the lateral dimension of said central portion and a bottom wall from a first piece of relatively resilient material, and a tubular portion from a second piece of relatively malleable material extending from said bottom wall,
   forming an aperture in each of said sidewalls,
   forming a straight knurl on said tubular portion inwardly of the distal end thereof so that said knurl projects radially outwardly of the periphery of said tubular portion, inserting said tab means in said apertures for retaining said member to said means, forming an opening in said bottom wall, providing a laterally projecting means at one end of said tubular portion, extending said tubular portion through said opening in said bottom wall so that said laterally projecting means is positioned between said member and said bottom wall, providing an opening in a workpiece substantially complementary to said periphery of said tubular portion, forcing said tubular portion into said opening in said workpiece so that said bottom wall is brought into engagement with said workpiece adjacent one end of said opening in said workpiece, said knurl becomes embedded in the wall of said opening in said workpiece, a bulge is created around the perimeter of the opposite end of said opening in said workpiece ahead of said knurl, and said distal end of said tubular portion projects beyond said opposite end of said opening in said workpiece, and then bending said distal end of said tubular portion outwardly so as to form a flange overlapping the surface of said workpiece adjacent said opposite end of said opening therethrough, and to push inwardly on said bulge to compress the material of said workpiece around said knurl.

8. The method as recited in claim 7 in which tabs are formed on one end of said tubular portion for providing said laterally projecting means.

9. The method as recited in claim 8 including the step of extending said tabs on one end of said tubular portion through said apertures in said sidewalls.

10. The method as recited in claim 1 in which said tab means of said member have a greater overall lateral dimension than the lateral spacing between said sidewalls, and in which one of said sidewalls is deflected outwardly in so inserting said tab means in said apertures.

* * * * *